United States Patent [19]
Waudoit

[11] Patent Number: 4,893,247
[45] Date of Patent: Jan. 9, 1990

[54] ORIENTATION AND LOCALIZATION TABLE ON MAP

[76] Inventor: Claude Waudoit, rue du Goddiarch 1, 6320 Villers-la-Ville, Belgium

[21] Appl. No.: 253,942

[22] Filed: Oct. 5, 1988

Related U.S. Application Data

[63] Continuation-in-part of Ser. No. 34,346, Mar. 30, 1987, abandoned.

[30] Foreign Application Priority Data

Mar. 28, 1986 [BE] Belgium .................................. 904513

[51] Int. Cl.⁴ ............................................ G06F 15/50
[52] U.S. Cl. .................... 364/449; 340/990; 340/995
[58] Field of Search .................... 364/443, 444, 449; 73/178 R; 340/988, 990, 995; 342/450, 451

[56] References Cited

U.S. PATENT DOCUMENTS

| | | | |
|---|---|---|---|
| 3,681,752 | 8/1972 | Cuddihy | 340/995 |
| 4,061,995 | 12/1977 | McCrickerd | 340/995 |
| 4,388,608 | 6/1983 | Bernard | 340/990 |
| 4,513,377 | 4/1985 | Hasebe et al. | 364/449 |
| 4,555,761 | 11/1985 | Matsumoto et al. | 364/449 |
| 4,638,438 | 1/1987 | Endo et al. | 364/449 |
| 4,672,563 | 6/1987 | Harumatsu et al. | 364/449 |

Primary Examiner—Gary Chin
Attorney, Agent, or Firm—Balogh, Osann, Kramer, Dvorak, Genova & Traub

[57] ABSTRACT

Device for a subject which is moving over the land is adapted to provide a mounting for a map of the immediate vicinity and having input signal means representing distance travelled and signal means representing changes of direction of travel, and responsive means which will move an object over the surface of the map to continuously represent the position of the subject with relation thereto.

4 Claims, 5 Drawing Sheets

ORIENTATION AND LOCALIZATION TABLE ON MAP

This application is a continuation-in-part of application Ser. No. 034,346 filed Mar. 30, 1987, now abandoned.

This invention concerns a device that helps to read a geographical map during the process of a journey covering the area described by the map.

Some prior art device is able to indicate either the location of the subject on the map by means of a point resulting from the inter-section of two straight lines, or by orientation of a map with regard to its support. There has not heretofore been known, a device which permits the subject to locate himself on the map by means of a luminous material reference marker which moves above the surface of the map and which indicates automatically and in a continuous manner to the observer, not only the location of the subject on the map, but also the instantaneous orientation of his displacement by means of the orientation of the support of the map. This objective is achieved according to the present invention through use of an orientation and localization table on a map, including a support designed to receive any form of a geographical map, this support being capable of swiveling in a plane through 360° of rotation. Also a locator device includes a mobile reference indicator arranged to move above the surface of the support of the map. Also indicated is a device to control the displacement of the mobile reference indicator which is characterized by the fact that the mobile reference indicator includes a light source and is designed to slide along two wires arranged in perpendicular direction and being supplied by an electrical power source.

The device of the present invention is intended to be mounted on a vehicle, such as an automobile or aircraft or the like, or it can be carried on the body of a pedestrian. The device may include a mechanism to control the orientation of the support map. The device controlling the displacement of the mobile reference and the orientation of the support for the map is adapted to respond to electrical signals admitted by a micro-computer connected to receive an orientation signal from an electronic compass and a displacement signal from a displacement indicator.

The micro-computer can also be arranged to respond to a steering signal provided by a steering wheel positioned sensor, this steering signal indicating the direction and degree of movement of the steering mechanism of the vehicle.

In a specific embodiment, this invention would be mounted on the steering wheel of a vehicle with an automatic map orientation support located on the supporting structure for the device.

In a pedestrian application a miniaturized version would be contemplated.

The invention is explained in greater detail with reference to the following drawings wherein.

Figure 1:
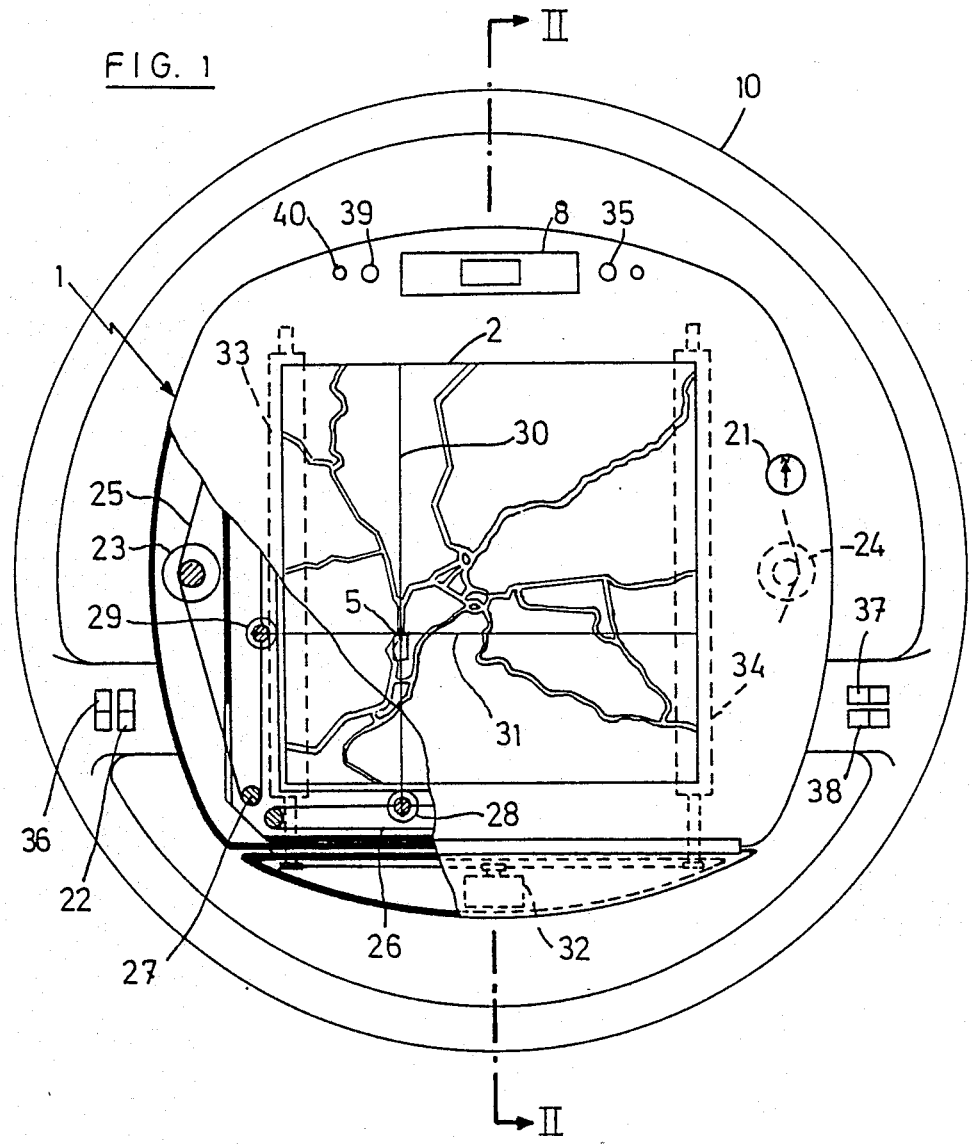
FIG. 1 illustrates, partially in side elevation and partially in section, a first embodiment of the device according to this invention.

FIG. 1 illustrates an example of the device installed on the steering wheel 10 of an automobile. The device includes a map support 1 mounted in the center of a steering wheel 10 and designed to receive any type of a geographical map or road map. The map support 1 is mounted in such a manner that it is capable of swiveling within a 360° angle in the plane of the drawing which is a plane perpendicular to the steering wheel axis.

Figure 2:
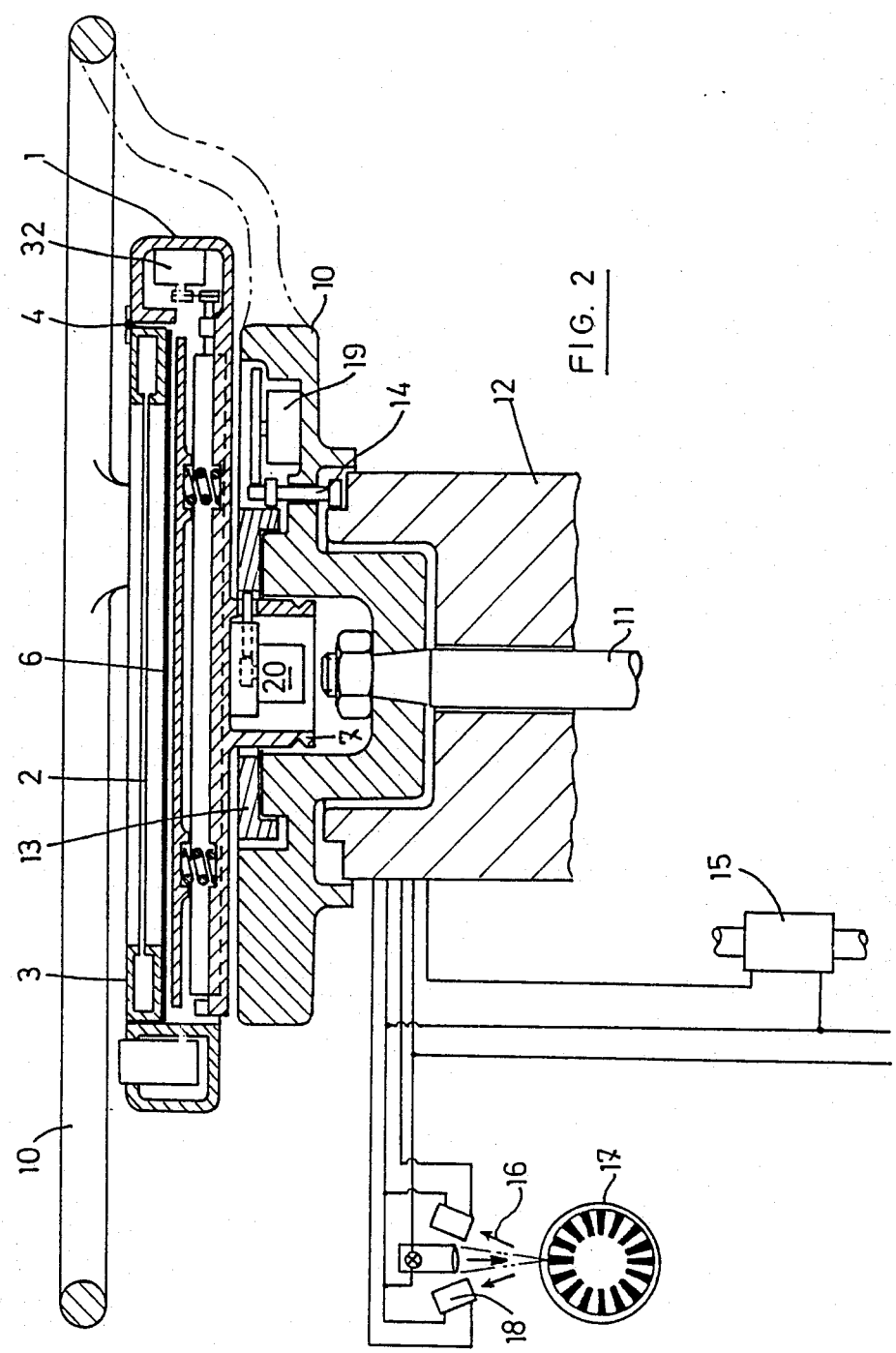
FIG. 2 is a section along line II—II of FIG. 1.

FIG. 2 illustrates a section along line II—II of FIG. 1. On the map support 1 is mounted a localization device 2 which includes a rigid frame 3 attached to the map support 1 by means of a hinge 4, and in which is located a localization mechanism including a mobile reference 5 which will move automatically above the map placed on the map support 1. A transparent sheet or panel 6 can be used to maintain the upper face of the map at the correct height relative to the mobile reference.

The mobile reference 5 is constituted by the assembly of 2 miniature cylinders perpendicularly oriented and electrically isolated one from each other, each of the cylinders moving freely around wires 30 and 31. The mobile reference 5 is provided with a light electrically powdered by the wires 30 and 31.

The mobile reference 5 can include a small axle installed perpendicularly to the plane of the map and supporting a small member free to rotate about said axle, so as to simulate the vehicle. Due to gravity the mobile reference 5 would be oriented downwardly, illuminating more intensively the portion of the map located adjacent the mobile reference, simulating the lights of the vehicle. A rheostat can be incorporated to adjust the intensity of the light.

The map support 1 has a hub 7 that is engaged with the center portion of the steering wheel 10 in such a way that it can turn freely with regard to the steering wheel and be powered by an electrical orientation motor 20, a stepping motor, for example, preferably attached to the map support.

The map support 1 is mounted in such a way that it can be oriented with regard to a support 12 fixed to the vehicle.

In the example shown, the support 12 is mounted around the steering shaft 11. Between the map support and the steering wheel 10 is located a disk 13 that is located on the steering wheel in a such a manner that it can be freely movable with regard to the steering wheel. The disk 13 is connected to the support 12 by a connecting mechanism to remain stationary in relation to the vehicle.

The automatic orientation of the whole map support and localization device 2 with regard to the support 12 and disk 13 is provided by the motor 20 controlled by the micro-computer 8 in such a way that it is continuous that it continuously maintains the north direction of the map oriented to the true magnetic north direction.

The micro-computer 8 monitors the mechanism of the orientation of the map support and the mechanism of the displacement of the mobile reference 5 in response to electrical signals continuously provided by a vehicle displacement indicator 15, a vehicle orientation indicator 17, and preferably by a steering wheel position indicator 19.

The map support 1 is designed to receive any kind of map, for example a road map or a map included in a guide or atlas. The map support can also be designed to receive a map or an assembly of portions of a map with different scales and different orientation that are rolled around two rollers 33 and 34 (FIG. 1) in such a manner that a complete circuit can be shown.

A map lighting device with a rheostat can also be included. A selector of orientation 21 (FIG. 1) manually operated or automatically operated by a micro-computer 8, allows adjusting of the orientation of the arrow on the selector 21 in a parallel direction to the north of the map introduced in the device.

The purpose of this adjustment is to add into the computer, a constant angular value of the angular value provided by the vehicle orientation indicator 18, in order to show the correct information on a map that would have the north oriented in any direction with regard to the map support 1. The automatic orientation device can be equipped with a switch 22 that allows for temporary neutralization of the automatic orientation means.

The automatic localization device preferably includes two electric motors 23 and 24, stepping motors, for example, attached to the frame of the localization device 2 (FIG. 1). The localization of the vehicle on the map is indicated by the reference 5 moving above the map that has been introduced between the map support and the localization device 2. The displacement of the reference 5 in the ordinate direction is provided by the electrical motor 23 which moves, for example, on a wire 25 on several three pulleys 27 to move in a like amount in a like direction with rollers 29 attached to the wire 31, causing displacement of the wire 31 parallel to itself in the ordinate direction and sliding of reference 5 around the wire 30.

A displacement of the reference 5 in the abscissa direction is obtained in a similar manner by the rotation of the electrical motor 24 moving the wire 26 to shift the rollers 28 attached to the wire 30 in the abscissa direction. Instead of moving the reference 5 in the abscissa direction, it is possible to actuated an electrical motor 32 to unroll a map that is rolled around the rollers 33 and 34 (FIG. 1). A manual switch 35 allows a selection of one of these two possible displacement modes abscissa direction.

The wires 30 and 31 are formed with a material having a good electrical conductivity to provide the electrical energy for the light located on the reference 5.

Two manual switches 36 and 37 (FIG. 1) are provided to supply the electrical motors 23 and 24 which move reference 5 anywhere above the map in a manual manner. This operation, as well as a change of the orientation, can also be automatically accomplished via the computer to follow a path indicated on the several positions of map attached one to other. A switch 38 controls both electrical motors 24 and 32 to effect a centering of a rolled map without any change of the location of the reference 5 with regard t the map. A push button switch 39 allows tuning of the speed of reference 5 with regard to the map while the bottom 40 allows tuning to the direction of displacement of the reference 5 with regard to the map.

The steering position sensor 19 provides to the micro-computer 8, a signal proportional to the movement of the steering mechanism of the vehicle in order to allow the calculation of the radius of the trajectory of the vehicle. This information combined with the information provided by the displacement sensor allows the computer to calculate the instantaneous orientation of the vehicle and to compare it to the information given by the vehicle orientation sensor 18 for a better accuracy of the instant orientation of the vehicle.

The micro-computer 8 is connected to receive the signal provided by the displacement sensor 15, the orientation sensor 18 and preferably the steering position sensor 19. In its simplest version, it can do the following:

From the input signals, it determines the orientation of the vehicle with regard to magnetic north.

For each pulse received by the displacement sensor 15, the micro-computer 8 converts the polar co-ordinates into rectangular co-ordinates.

The micro-computer 8 reduces the rectangular co-ordinates in function of the scale of the map introduced and controls the displacement of the reference 5, the orientation of the map support and eventually the unrolling of the map.

The displacement sensor 15 is capable of providing electrical pulses in relation to the displacement of the vehicle, each pulse being related to a given distance travelled by the vehicle. Each pulse starts a conversion of polar co-ordinates into rectangular co-ordinates in the computer. The displacement indicator can be a simple pulse generator connected to the transmission of the vehicle.

The vehicle orientation sensor 18 provides to the micro-computer, a signal related to the orientation of the vehicle with regard to the magnetic north. This indicator is preferably an electronic compass.

The device according to the present invention can also be mounted on the dash board of a vehicle. In this circumstance, the hub 7 of the map support 1 can be introduced directly into the support 12 that is stationary on the vehicle.

The orientation and localization device according to this invention is preferably notched in order to be easily removed from its support when it is not used.

Figure 3:
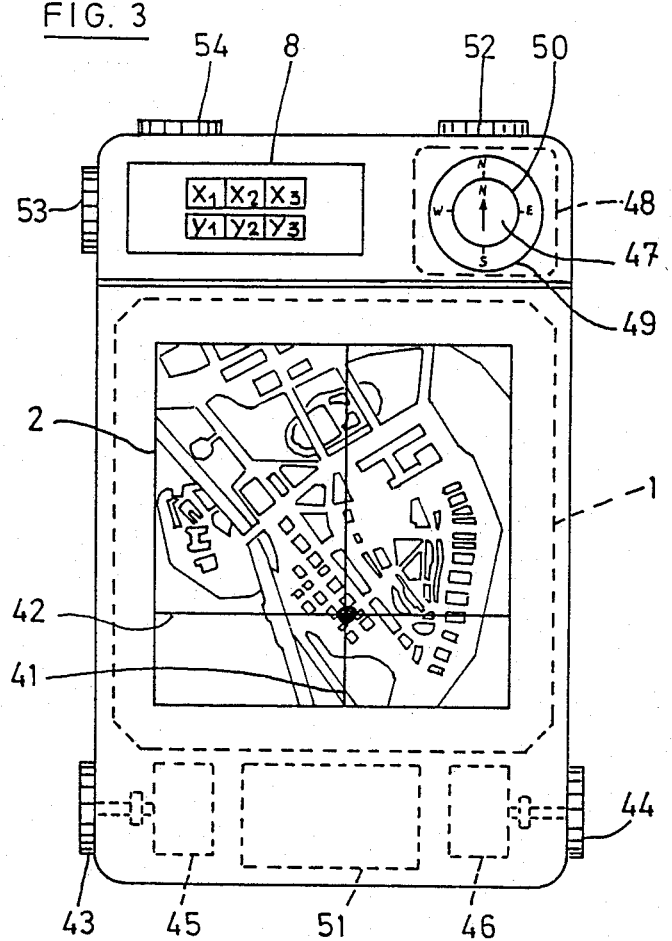
FIG. 3 illustrates supportable integrated version according to this invention.

FIG. 3 shows a version of the device of this invention designed for use by a pedestrian. It is primarily a miniature and an integrated version of the device previously described. In the center of the frame, there is shown the localization device 2 with the mobile reference 5 which slides along the wires 41 and 42.

In the localization device 2, the movement of the wires 41 and 42, parallel to themselves to locate the reference 5 and they are manually powered by the buttons 43 and 44 that are also connected to the potentiometers or impulse generators 45 and 46 to display on a screen, the co-ordinates X and Y of the reference 5.

The device includes an electronic compass 48 to measure the orientation of the frame of the device with regard to the true magnetic north. The adjustable disk 49 is used to indicate to the mini-computer 8 what is the direction of the north on the map introduced into the device. A displacement indicator 51 is included and consists in a device designed to generate one pulse for each step made by the pedestrian.

The mini-computer 8 is designed to keep in its memory and to display to co-ordinates of the starting point $(X_1, Y_1)$, to display the co-ordinates of the mobile reference over the map $(X_2, Y_2)$ and to display the present co-ordinates of the pedestrian $(X_3, Y_3)$. Those co-ordinates of the pedestrian location are calculated using the information provided by the electronic compass and the displacement indicator.

The orientation button 52 is used to introduce into the calculator, the direction of displacement of the pedestrian by orientating an arrow in the direction of the displacement.

An adjustable button 53 allows for the adjustment for the average length of the steps taken by the pedestrian.

An audible signal can inform the pedestrian that he is proceeding out of the limits of the map that is introduced in the device.

When he starts, the pedestrian adjusts the disk 49 in relation to the direction of the north on the map that he has introduced into the device. Then using the buttons 43 and 44, he moves the reference 5 over the point of the map where he is located and he adjusts the button 52 to indicate the direction of his displacement with regard to the frame of the device. He engages starting button 51 to introduce into the memory, the starting co-ordinates and to start the measurement and calculation of the co-ordinates. During the journey of the pedestrian, the computer calculates the new co-ordinates and continuously displays the present values of the co-ordinates of the pedestrian ($X_3$, $Y_3$). When the pedestrian wants to know his position, he moves the mobile reference 5 by turning the buttons 43 and 44 until $X_2$ and $Y_2$ values show respectively the same number through $X_3$ and $Y_3$. Then he orients the device in its proper plane using the information provided by the compass shown through the window 50. He can find again his starting position by turning the buttons 43 and 44 until the $X_2$ and $Y_2$ values show respectively the same members as $X_1$ and $Y_1$.

Figure 4:
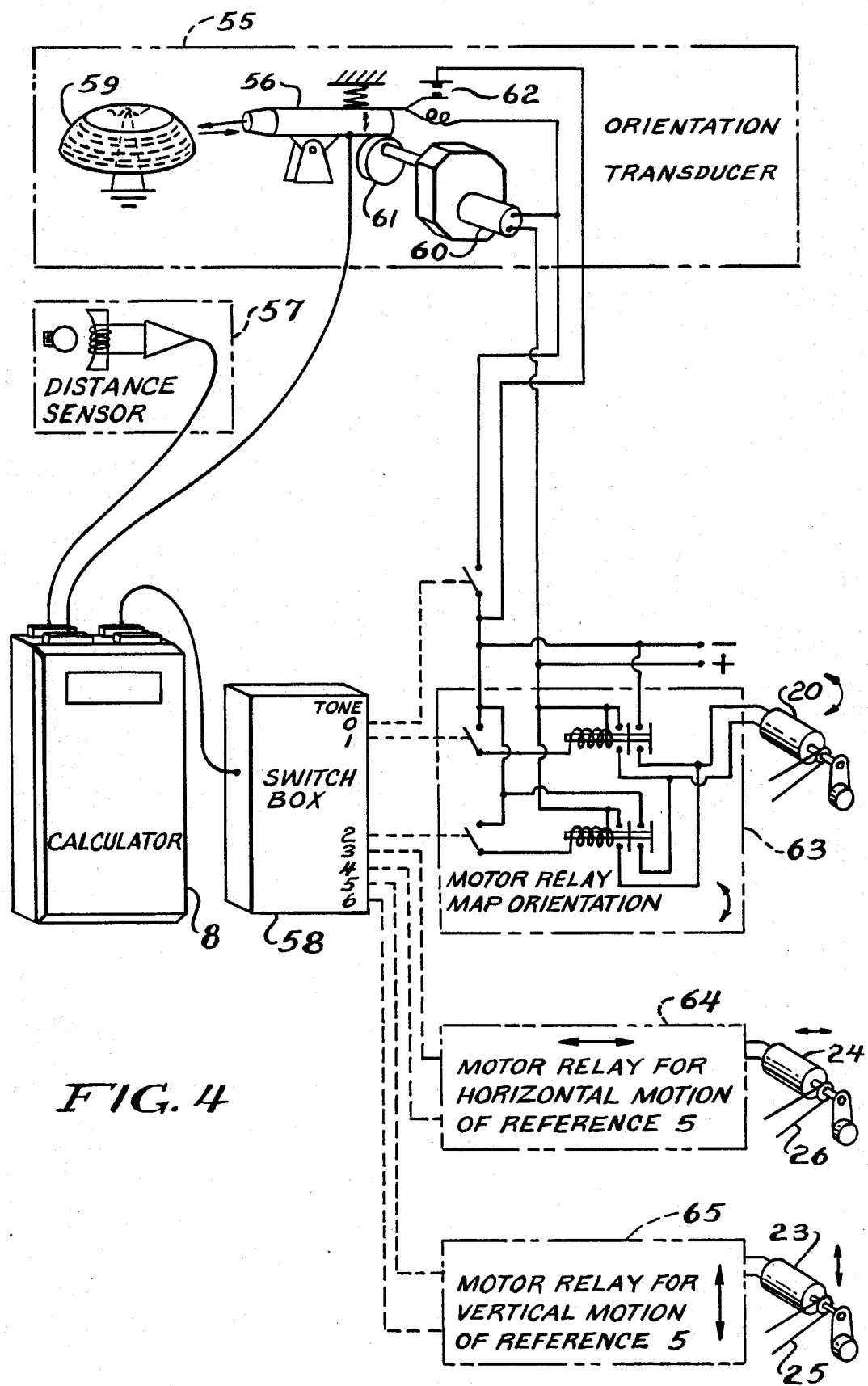
FIG. 4 is a schematic lay-out of the components comprising the first embodiment of the invention.

Referring to FIG. 4, the calculator 8 shown is a Hewlett-Pachard HP 41 connected to a Hewlett-Pachard No. 82153 code bar reader 56, a distance sensor 57, and to a HP 41 suitable box 58.

The distance sensor 57 generates pulses that arm one of the internal indicators of the calculator 8. The orientation transducer 55 includes the code bar reader 56 that moves in a vertical plane to read the vehicle orientation on a magnetic compass 59 having an external face covered with code bars.

The vertical motion of the code bar reader 56 is initiated by the calculator which generates a signal (TONE O) to close one of the switches in the switch box 58 for 0.3 second, thus energizing a mini-electrical DC motor 60 which turns a cam 61 to close a switch 62. The cam 61 turns one full revolution until the switch 62 is opened again.

The switch box 56 amplifies each TONE signal from the calculator (10 different TONES available on the HP 41) to close a corresponding electrical switch (not shown).

The motor relay 63 energizes a miniature DC motor 20 clockwise when TONE 1 is generated by the calculator, resulting in a change of the orientation of the support of map 1 by 10 degrees clockwise.

In the same manner, TONE 2 will cause a change of the orientation of the support 1 by 10 degrees counterclockwise.

The motor relays 64 and 65 work in the same manner. The motor 24 responds to signals, TONE 3 and TONE 4, to move the reference 5 along the abscissa (east-west direction) while the motor 23 responds to signals, TONE 5 and TONE 6, to move the reference 5 along the ordinate axis (north-south direction).

Each miniature DC motor 20, 23, and 24 is preferably mounted horizontally and is equipped with an eccentric mass that moves the center of gravity of the rotor out of the rotor centerline. This causes the DC motor to stop every time in the same angular position so the motor turns a given constant number of turns (3 for example), for each TONE signal generated by the computer, thereby avoiding an accumulation of errors due to imprecise position at rest of the rotor.

Figure 5:
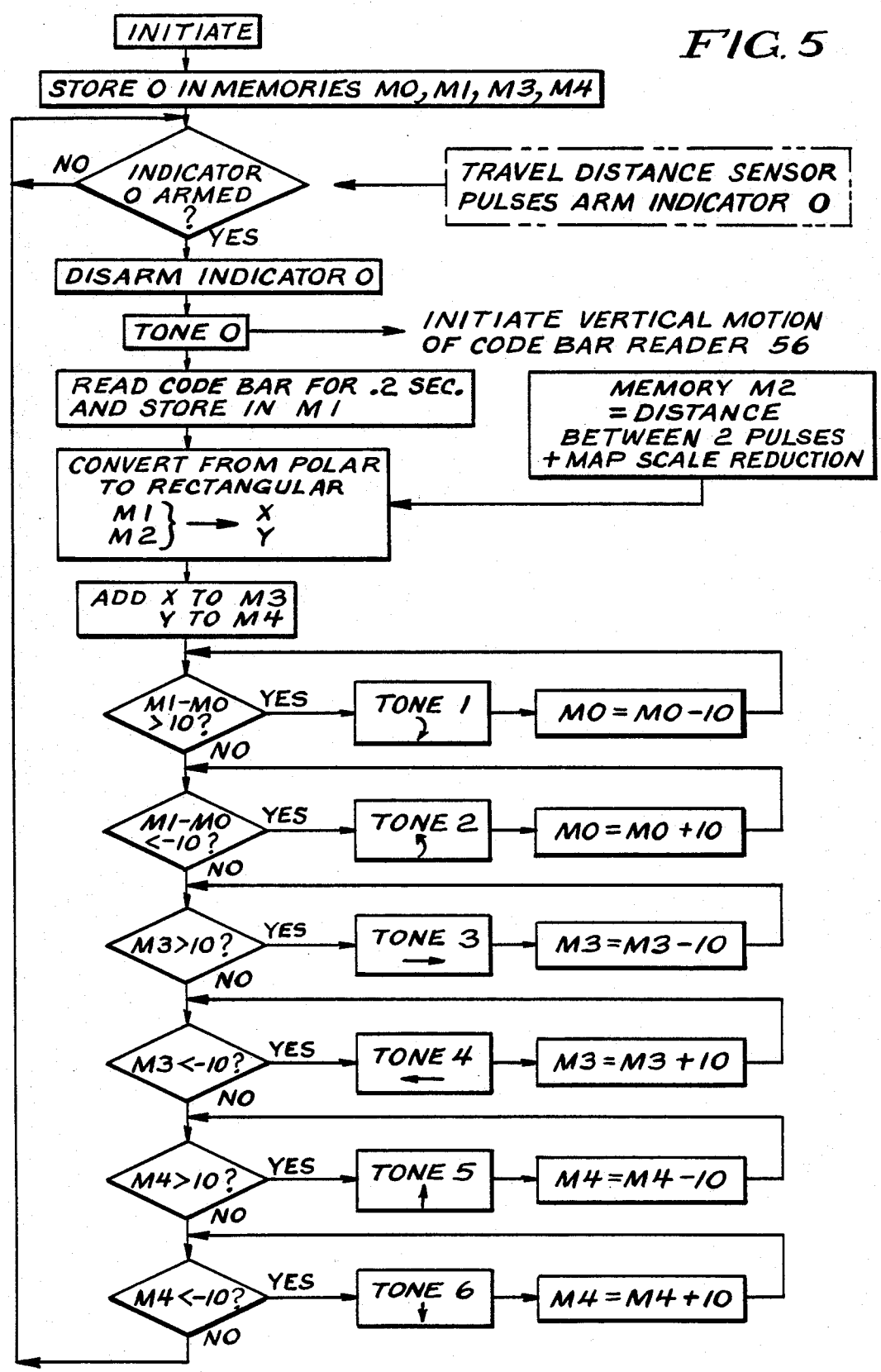
FIG. 5 is a flow chart used for the calculator program.

FIG. 5 shows the flow chart used for the calculator program. The distance travelled by the vehicle between two pulses generated by the distance sensor 57, reduced to the map scale, has to be introduced manually into a constant memory M2 in the calculator 8.

The pulse generated by the travel distance sensor 57 starts the process of measurement of the vehicle orientation relative to the magnetic north and starts the valve (0° to 360°) in the memory M1. The calculator recalls the memories M1 and M2 and converts them from polar to rectangular values. Then it adds the rectangular values X and Y, respectively, to the memories M3 and M4.

The TONE signals 1 to 6 are actuated or not depending on the amount of change in the orientation and localization. TONE 1 and TONE 2 signals generated by the calculator cause a change in the orientation of the support of map 1 by 10 degrees, respectively, clockwise or counterclockwise. TONE 3 and TONE 4 signals cause the displacement of the reference 5 over the map in the horizontal direction by 1 mm, respectively, to the right or to the left.

TONE 5 and TONE 6 signals cause the displacement of the reference 5 over the map in the vertical direction by 1 mm, respectively, upward or downward.

What is claimed is:

1. A map position orientation and location apparatus employing inexpensive and commercially available DC motors with a calculator, said apparatus indicating the position of a carrier such as a vehicle, on a map, comprising a map support adapted to be movably supported on a steering wheel, an electrical orientation DC motor for moving said map support with respect to said steering wheel, a localization device including a mobile reference mounted on said map support so that the mobile reference will move automatically above the map placed on the map support, said mobile reference being provided with a light source supported by the wires actuated by a pair of DC motors, roller means for supporting said map over said map support, a steering wheel position sensor connected to said calculator and providing a signal proportional to the steering mechanism of the vehicle, a vehicle displacement indicator including a displacement sensor connected to said calculator, a vehicle orientation indicator connected to said calculator, whereby said calculator monitors the mechanisms of the orientation of the map support and displacement of the mobile reference in response to electrical signals continuously provided by said vehicle displacement indicator, the vehicle orientation indicator, and the steering wheel position sensor.

2. Apparatus according to claim 1, wherein said calculator is a micro-processor connected to receive an orientation signal from an electronic compass, said orientation signal showing the displacement between the map support and the magnetic north, and a displacement signal from the vehicle displacement indicator, said displacement signal indicating the distance of the displacement of the map support.

3. Apparatus as claimed in claim 1, wherein said map support includes a hub 7 adapted to be mounted on the steering wheel of said vehicle, a disk installed for free rotation with said hub and being linked to a support stationary on the vehicle via a linking mechanism.

4. Apparatus according to claim 1, wherein said wires comprise movable perpendicularly disposed driving wires slidingly attached to said mobile reference and being connected to an electrical power source to energize said light source.

* * * * *